United States Patent [19]

Woody

[11] Patent Number: 4,526,300
[45] Date of Patent: Jul. 2, 1985

[54] CONFECTION DECORATING MATERIAL DISPENSING MACHINE

[76] Inventor: George D. Woody, 919 18th St. N.W., Washington, D.C. 20006

[21] Appl. No.: 102,247

[22] Filed: Dec. 10, 1979

Related U.S. Application Data

[63] Continuation of Ser. No. 823,613, Jul. 11, 1977, abandoned.

[51] Int. Cl.³ .............................................. B67D 5/62
[52] U.S. Cl. ................................. 222/146.5; 222/159; 222/318
[58] Field of Search ............... 222/318, 146 HE, 159, 222/333, 529; 219/214, 296; 137/341; 138/33; 415/178; 417/313

[56] References Cited

U.S. PATENT DOCUMENTS

| 2,378,184 | 6/1945 | Carlson | 222/318 X |
| 2,578,863 | 12/1951 | Trelease | 222/318 X |
| 2,633,340 | 3/1953 | Zagray et al. | 222/318 X |
| 2,733,661 | 2/1956 | Surgi | 417/313 X |
| 3,129,730 | 4/1964 | Simon | 222/159 X |
| 3,149,555 | 9/1964 | Baum et al. | 222/318 X |
| 3,879,600 | 4/1975 | Beck | 138/33 X |
| 3,921,858 | 11/1975 | Bemm | 222/146 HE |

Primary Examiner—Charles A. Marmor
Attorney, Agent, or Firm—Newton, Hopkins & Ormsby

[57] ABSTRACT

A decorating material dispensing machine having a pump and maniford disposed within a heating chamber for supplying decorating material, such as chocolate or the like, from a reservoir tank to one or a plurality of nozzles. A pressure gauge, thermometer and window permit monitoring of the operation of the dispenser. An adjustable valve determines the back pressure and therefore delivery pressure of the system and a thermostatic dial, the temperature of the chamber.

10 Claims, 6 Drawing Figures

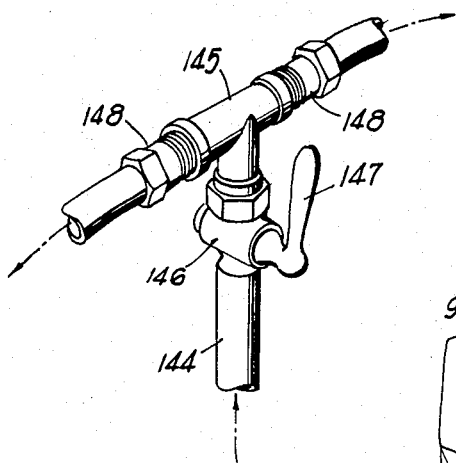
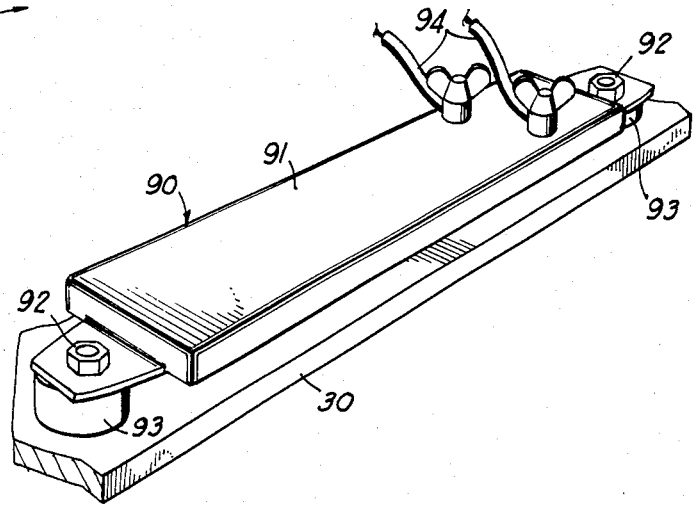
FIG 3
FIG 4
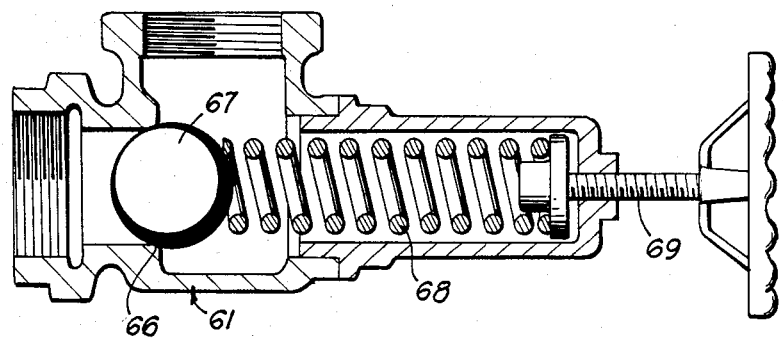
FIG 5
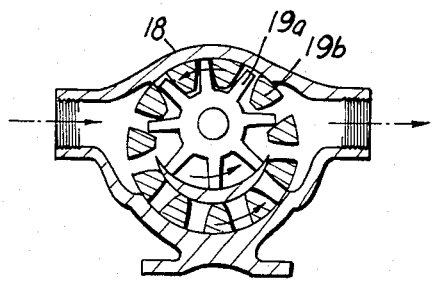
FIG 6

CONFECTION DECORATING MATERIAL DISPENSING MACHINE

CROSS-REFERENCE TO RELATED APPLICATION

This is a continuation of application Ser. No. 823,613, filed July 11, 1977 (now abandoned).

BACKGROUND OF THE INVENTION

1. Field of the Invention

This invention relates to a decorating material dispensing machine and is more particularly concerned with a dispenser for dispensing chocolate or other viscous materials at a prescribed temperature.

2. Description of the Prior Art

In the past, cake icing and chocolate have been dispensed almost exclusively by use of a hand operated pastry bag which includes a nozzle, having a removable funnel-shaped tip through which the material is extruded and a flexible bag containing the material to be dispensed, the flexible bag being hand operated whenever it is necessary to dispense the material.

The prior art manual pastry bag has many disadvantages. For example, it can be operated only intermittently since it must be refilled at intervals. It is messy and requires manual dexterity in order to extrude the proper amount of material from the manual dispenser. The operator encounters fatigue with continued use and the material being extruded tends to change viscosity, due to changes in temperature and due to a drying out of the material. If left overnight, the pastry bag may freeze up and may require washing before it can again be used. Furthermore, only a single operator can use a single bag.

SUMMARY OF THE INVENTION

Briefly described, the decorating material dispensing machine of the present invention, which is believed to overcome the disadvantages described above, includes a positive displacement pump within a heating chamber of a housing, the pump supplying the viscous material, such as a slurry of chocolate, from a supply tank to a dispensing manifold. The manifold has four outlets, one communicating through a back pressure control valve with a return pipe discharging into the open top of the tank. A second outlet leads to a remote decorator nozzle, via a manual on-off valve and a flexible hose. In one embodiment, the single outlet leads to a pair of such remote decorator nozzles and a pair of flexible hoses. The other two outlets of the manifold are closed respectively by a pressure gauge and a thermometer. A thermostatically controlled heater within the housing heats the manifold so as to maintain the decorating material in a fluid condition. The housing is made from sheet metal, such as stainless steel, which is easily cleaned and has good heat transfer characteristics so that the nozzle and hose can be draped over the housing and maintained in a heated condition when not in use.

A window in the form of a transparent sleeve connects the discharge pipe of the tank to the intake pipe of the pump. The pump is a positive displacement pump.

Accordingly, it is an object of the present invention to provide a decorating material dispensing machine which is inexpensive to manufacture, durable in structure and efficient in operation.

Another object of the present invention is to provide a decorating material dispensing machine in which the quantity of material in the reservoir tank can be visually observed and will be automatically agitated when the dispenser is cut on.

Another object of the present invention is to provide a decorating material dispensing machine in which the material flowing through the dispenser can be visually observed.

Another object of the present invention is to provide a decorating material dispensing machine in which the material is maintained in a transportable, relatively fluid condition, regardless of the ambient temperature.

Another object of the present invention is to provide a decorating material dispensing machine in which the pressure of dispensing is maintained at a generally constant pressure which can be readily varied, as desired.

Another object of the present invention is to provide a decorating material dispensing machine in which the temperature of material can be maintained at a prescribed temperature.

Another object of the present invention is to provide a decorating material dispensing machine which requires little physical exertion to use.

Another object of the present invention is to provide a decorating material dispensing machine which can be filled without interrupting the operation of the machine and in which the quantity of material remaining in the machine and the need for refilling can be readily ascertained.

Another object of the present invention is to provide a decorating material dispensing machine which will enable the operator to decorate candy using only one hand and in which the material is smoothly and evenly dispensed at a controlled rate without appreciable bubbles or spurts.

Other objects, features and advantages of the present invention will become apparent from the following description when taken in conjunction with the accompanying drawings, wherein like characters of reference designate corresponding parts throughout the several views.

BRIEF DESCRIPTION OF THE DRAWING

FIG. 3 is an enlarged view of a modified form of discharge conduit which can be used with the machine depicted in FIGS. 1 and 2;

FIG. 4 is an enlarged view of a detail showing the heating element of the machine depicted in FIGS. 1 and 2;

FIG. 5 is a vertical, sectional view of the non-return check valve of the machine depicted in FIGS. 1 and 2; and FIG. 6 is a vertical sectional view of the positive displacement pump of the machine of FIGS. 1 and 2.

DESCRIPTION OF THE PREFERRED EMBODIMENTS

Figure 1:
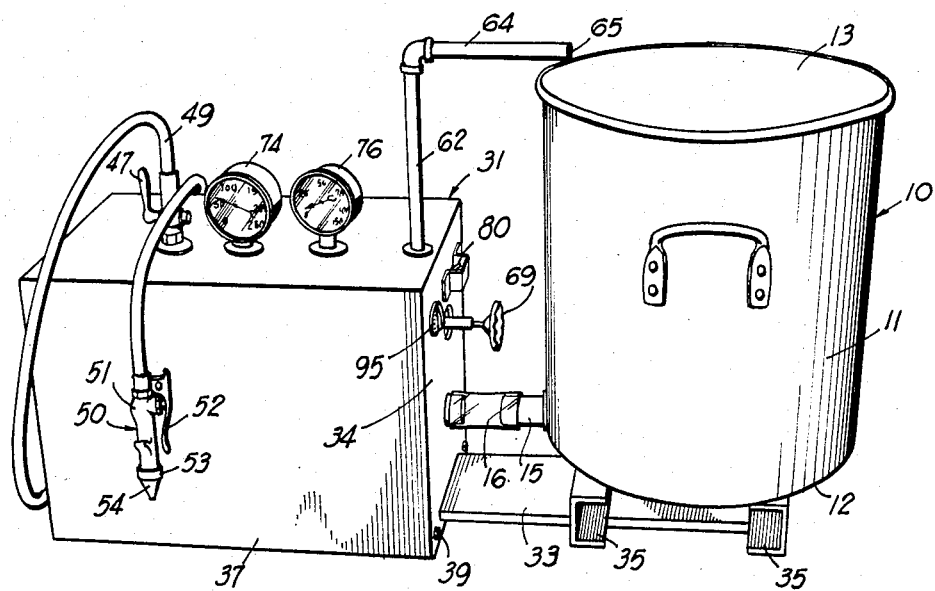
FIG. 1 is a prospective view of a confection decorating material dispensing machine constructed in accordance with the present invention.

Referring now in detail to the embodiments chosen for the purpose of illustrating the present invention, numeral 10 in FIG. 1 denotes the reservoir tank of the confection decorating material dispensing machine. The particular reservoir tank 10 depicted in the drawing is a tank having a cylindrical side wall 11 and a flat bottom 12. The tank 10 is wholly open at its top 13 so that material which has been pre-prepared in mixing vats and the like can be readily poured from such mixing vats into the reservoir tank 10. The decorating material can be any of a variety of viscous fluids, such as liquid chocolate or icings of various types.

At one side of wall 11, adjacent bottom 12, a discharge pipe 15 is provided, the discharge pipe 15 receiving a flexible transparent window, sleeve or tubing 16 over its outer end portion. The other end of the transparent window or sleeve 16 is received on the intake pipe 17 of a positive displacement pump 18. Thus, the discharge pipe 15 of the reservoir tank 10 communicates with the intake pipe 17 of the pump 18, via a removable transparent sleeve 16 which forms a window through which the initial flow of the material from the bottom portion of tank 10 into the pump 18 can be observed. The window or sleeve 16 is flexible and removable so that the tank 10 need not be aligned with the pump 18 and can be removed and transported for filling, if desired. Also, this facilitates the cleaning out of pump 18, should the occasion arise.

The pump 18 is a positive displacement rotary which has an inner star rotor 19a and an outer excentric rotor 19b within which the prongs of the inner rotor 19a engage so as to provide suction on pipe 17 and discharge the material via the discharge pipe 19 into an elbow 20 which is connected thereto. The pump 18 is driven by an electric motor 21 through a pulley 22 on the motor 21 which, in turn, drives a belt 23, the belt 23 passing over a pulley 24 on the shaft 25 of the pump 18.

Both the motor 21 and the pump 18 are bolted respectively by bolts 26 and 27 to the flat metal bottom or base 30 of a hollow rectangular housing, denoted generally by the numeral 31. In more detail, the housing 31 includes a downwardly opening stainless steel hood having spaced, opposed, vertical, transverse end walls 34 and 35, the edges of which are joined by spaced, opposed, longitudinally extending, vertical side walls 36 and 37 to form a rectangular tubular member closed at its top by a flat top 40.

The width of the walls 34 and 35 is greater than the width of bottom 30 so that ventilation openings 30a are provided along the sides of bottom 30.

The housing 31 is supported by a plurality of adjustable legs 32 threadably received at the corner portions of housing 31, in cross bars 29 secured to the bottom end portions of bottom 30. A tank support platform 33 extends horizontally sidewise from the cross bars 29 below wall 34, as illustrated in FIG. 1.

The legs 32 of the housing 31 support the tank platform 33 in an elevated position and the platform 33, itself, supports a pair of spaced channel members which are the support blocks 35 which receive the bottom 12 of tank 10 thereon. It is thus seen that the decorating material which may inadvertently spill out of the tank 10 onto a table top or the like which supports the dispensing apparatus, can be readily cleaned while the dispensing apparatus remains stationary. Also, since the base or bottom 30 of the housing 31 is supported in an elevated position by the legs 32, any clean out under the housing 31 is facilitated.

The removeable hood formed by walls 34, 35, 36, and 37 and top 40 provides a closed heating chamber 41 which houses the motor 21 and the pump 18 as well as certain other equipment to be described, hereinafter.

Returning now to the pump 18 and the elbow 20 which is secured to the discharge side of the pump 18, the elbow 20 discharges upwardly into a connector pipe 42 which, in turn, is threadedly secured to and communicates with a hollow rectangular closes manifold 43. The manifold 43 is disposed horizontally within the upper portion of chamber 41 and is spaced below the top 40 but above both the motor 21 and the pump 18. It is supported in place by the pipe 42 and by a discharge pipe 44 at one end portion of the manifold 41, the discharge pipe 44 projecting upwardly through the top 40 and being provided with a washer 45 and a manual cut off valve 46. The valve 46 is threadedly received on the upper end portion of the pipe 44. Vavle 45 has a lever 47, by means of which the valve 46 may be opened or closed, manually. The discharge end of the valve 46 receives a coupling 48 secured to the proximal end of a flexible hose 49 of a nozzle assembly. The other or distal end of the flexible hose 49 is secured to a discharge nozzle member 50 which is provided with a manually depressible discharge control gate valve 51. The valve 51 is spring loaded closed but is actuated by a lever 52 which is pivotally disposed approximately parallel to the axis of the nozzle member 50 so as to be depressed by the hand of a person holding the nozzle member 50. The nozzle portion 53 of the nozzle member 60 removably receives and fractionally holds a frusto-conical dispensing tip 54 which may be selectively removed and replaced, as desired. Innumerable conventional nozzle tips, such as tip 54, can be substituted for the nozzle 54 so as to provide an appropriate configuration for the stream of material which is emitted from the nozzle portion 53 when the lever 52 is depressed and when the motor 18 is operating and the valve 46 is open.

As shown in FIG. 3, a modified form of the invention includes an upstanding discharge pipe 144 which can be substituted for the pipe 44, if desired. This pipe 144 communicates through a manual valve 146 with tee pipe 145. The ends of the tee pipe 145 respectively receive thereon the ends of the coupling, such as coupling 148 for a hoses 149 which are similar to hose 49 of the nozzle assembly previously described.

The manifold 43 and its inner end is provided with a short section of pipe 60 which projects sidewise from the manifold and threadedly receives the intake port of a back pressure control valve 61, the discharge port of which threadedly receives an upstanding discharge pipe 62. Pipe 62 projects up through an appropriate hole in the top 40 and terminates above the level of the upper end of the tank 10, the discharge pipe 62 being provided with a 90° elbow 63 which, in turn, is provided with a horizontal discharge or return pipe 64. The discharge or return pipe 64 has an open discharge end 65 which discharges excess material back into the tank 10. Thus, the discharge end 65 of the horizontal pipe 64 terminates over the upper open end of tank 10. The discharge of the material back into the tank 10 creates a turbulance in the remainder of the material in the tank 10 so that the material is maintained in an agitated condition in the tank 10.

As seen in FIG. 5, the back pressure control valve 61 is preferably a non-return ball check valve which includes a valve seat 66 receiving a ball valve 67. A spring 68 urges the ball 67 to a closed position on the seat 66. The compression of spring 68 can be varied by manipulation of a rotary handle 69, as is common for ball check valves of this type. The end portion of valve 61 extends sidewise through the wall 34, as shown in FIG. 2, so that the handle 69 is disposed externally of housing 31 in a position for manual manipulation, as desired.

Figure 2:
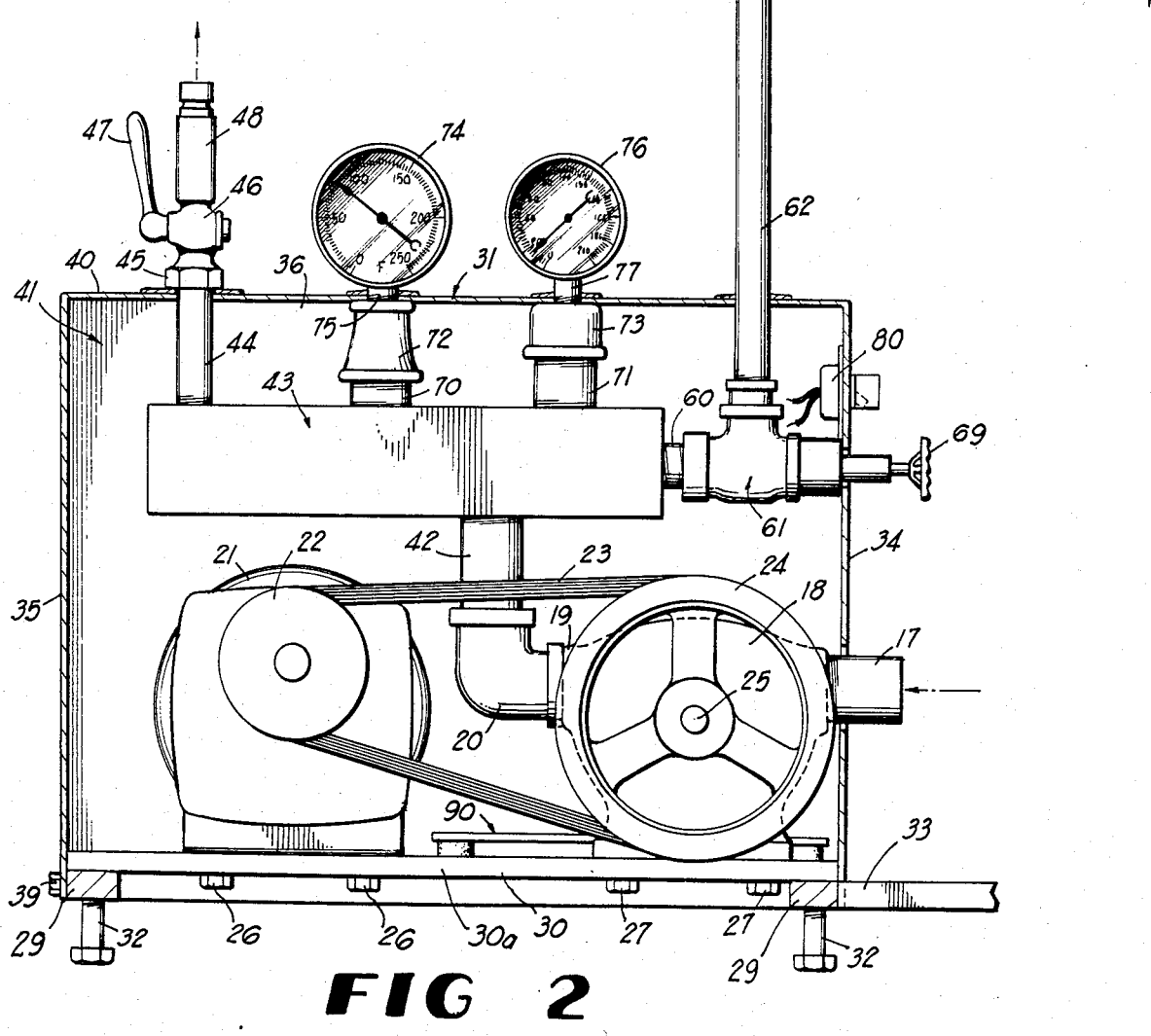
FIG. 2 is an enlarged vertical, sectional view of the machine depicted in FIG. 1.

As seen in FIG. 2, the discharge ports of manifold 43 are provided with upstanding spaced pipes 70 and 71 which respectively threadedly receive caps 72 and 73. A pressure gauge 74 which has a threaded sensor tip or stem 75 is mounted on the housing 31 so that the sensing tip or stem 75 projects through the top 40 and is threadedly received by the cap 72. In like fashion a pressure gauge 76 is provided with a threaded detector tube or stem 77 which projects through the top 40 and is threadedly received by the cap 73. The two gauges 74 and 76 are disposed in juxtaposition for simultaneous observation and their threaded stems 75 and 77 are aligned transversely with the valve 46 and the pipe 62.

The motor 21 is provided with an on/off switch 80 which is carried by the wall 34 in a position adjacent to the handle 69.

Disposed along the bottom or base 30 is an electrical resistance element or heater, denoted generally by numeral 90. This electrical resistance heater is shown both in FIGS. 2 and 4 and includes a resistance strip 91, the ends of which are mounted by bolts 92 to the bottom 30, the bolts passing through spacer elements 93. The resistance element 91 is electrically connected by wires 94 through a thermostat 95, seen in FIG. 1, to a source of current. By setting the dial of the thermostat 95, the temperature of the chamber 41 can be prescribed as desired.

OPERATION

From the foregoing description, the operation of the dispensing machine should be apparent. When it is desired to use the machine, it is connected to a source of current so that when switch 80 is turned on, the motor 21 is energized. Also, the source of current will supply electricity for the heating of the electrical resistor element 90.

Before the motor 21 is cut on, the tank 10 is filled or partially filled with material so that when the motor 21 is cut on, the motor takes a suction via pipe 15, window sleeve 16, and pipe 17 and discharges the material from tank 10 into the manifold 43. This, of course, builds up a pressure which is read on gauge 76. When the pressure reaches a prescribed pressure, the check valve 61 opens and therefore the material is discharged via pipes 62 and 64 into the tank 10. Hence, when no material is discharged, by the nozzle assembly or assemblies, all of the material is simply recirculated by the pump 18 back into the tank 10. The valve 46 or the valve 146 is opened during operations and a person, doing the decorating, grasps the nozzle 50 in his hand and depresses the nozzle lever 52 while holding the nozzle tip 54 over the cake to be decorated. He then depresses the lever 52, so as to discharge the material, as desired. Periodically, the operator may wish to change the tips, such as tip 54, so as to provide the selected configuration for the decoration. The depressing of the lever 52 requires little energy and hence the decorating of the cake is far less tiresome than using the prior art manual decorators.

When the operator completes using the nozzle 50, he drapes the hose 49 over the housing 31 so that the heated housing 31 transfers heat to the hose 49 or 149 and the nozzle such as nozzle 50. The reason for this is that, when the machine is left overnight and the ambient air drops below the freezing point, the material might freeze and solidify. With the heating element 90 operating, however, this freeze-up of the material in the machine is precluded. Of course, the material may freeze or solidify in the tank 10; however, since this tank is readily accessible and, indeed, may be readily removed from the remainder of the machine, if desired, it presents no particular problem.

Since the present machine is made essentially from readily available elements on the market, the machine is relatively inexpensive to manufacture and yet is quite effective in providing an improved apparatus for decorating cakes and candies. The operators tend to be less fatigued since they do not need to exert any pressure on the mechanism, other than is necessary for opening the valve. If the material becomes too thick, it is a simple matter to add liquid to the material in the tank 10 and permit this liquid to be mixed by operation of the pump 18. When the viscosity changes in the nozzle, the handle 69 can be manipulated so as to increase the pressure to thereby force the material out of the nozzle 50. Since the handle 69 determines the pressure at which the material will be discharged from nozzle 50, materials of different viscosities may be utilized in the apparatus of the present invention and the discharge regulated through manipulation of the handle 69.

I claim:

1. A decorating material dispensing machine comprising, a housing, a pump within said housing, an upwardly open reservoir tank outwardly of and adjacent to said housing for providing a source of fluid decorating material, connector means removably connecting said reservoir tank to the intake side of said pump, a flexible hose externally of said housing, means on said housing connecting the proximal end of said flexible hose to the discharge of said pump, a decorator nozzle member on the distal end of said flexible hose, a back pressure control valve within said housing communicating with the discharge side of said pump and a return line carried by said housing and extending over the open upper end of said tank and connected to said back pressure control valve for returning excess material to said source and over the top of said reservoir tank, said reservoir being removable from a position outwardly adjacent to said housing when said connector means is disconnected between said pump and said reservoir tank.

2. The machine defined in claim 1 wherein said decorator nozzle member includes a valve at the discharge portion of said nozzle and a lever connected to said valve and disposed adjacent to said valve for actuation by a person who is holding the nozzle in one hand and engaging the lever with that hand.

3. The machine defined in claim 2 wherein said nozzle member includes a removable dispensing tip which can be hand removed for the substitution of another tip, therefor.

4. A decorating material dispensing machine comprising, a housing, a pump within said housing an upwardly open reservoir tank outwardly of and adjacent to said housing for providing a source of fluid decorating material, connector means removable connecting said reservoir tank to the intake side of said pump, a flexible hose externally of said housing, means on said housing connecting the proximal end of said flexible hose to the discharge of said pump, a decorator nozzle member on the distal end of said flexible hose, a back pressure control valve within said housing communicating with the discharge side of said pump, a return line carried by said housing and extending over the open upper end of said tank and connected to said back pressure control valve for returning excess material to said source and over the top of said reservoir tank, said reservoir being removable from a position outwardly adjacent to said housing when said connector means if disconnected between said pump and said reservoir tank, said means includes a manifold connected to the discharge side of said pump, said manifold having openings connected respectively to said nozzle and to said back pressure control valve so that the communication of said back pressure control valve with said pump is through said manifold.

5. The machine defined in claim 4 including a pressure gauge and a temperature gauge, the stems of which are connected to said manifold through said housing.

6. A decorating material dispensing machine comprising, a housing, a pump within said housing, an upwardly open reservoir tank outwardly of an adjacent to said housing for providing a source of fluid decorating material, connector means removable connecting said reservoir tank to the intake side of said pump, a flexible hose externally of said housing, means on said housing connecting the proximal end of said flexible hose to the discharge of said pump, a decorator nozzle member on the distal end of said flexible hose, a back pressure control valve within said housing communicating with the discharge side of said pump, a return line carried by said housing and extending over the open upper end of said tank and connected to said back pressure control valve for returning excess material to said source and over the top of said reservoir tank, said reservoir being removable from a position outwardly adjacent to said housing when said connector means is disconnected between said pump and said reservoir tank, and a heater remote from said tank, adjacent to said manifold and said pump and within said housing for maintaining the material in the manifold and pump in a flowable condition.

7. The machine defined in claim 6 wherein said connector means includes a transparent window between said tank and said pump whereby the flow of material from said tank to said pump can be observed.

8. The machine defined in claim 6 wherein said housing has a base on which said pump is mounted, a platform extending externally of said housing and wherein said tank is mounted on said platform.

9. A decorating material dispensing machine comprising, a housing, a pump within the lower portion of said housing, a manifold above said pump within said housing, a manifold above said pump in said housing an elbow pipe connected to the discharge side of said pump and to said manifold, a motor within said housing for driving said pump, an upwardly open reservoir tank removably connected to the intake of said pump externally of said housing for supplying decorating material in a liquid condition to said pump, a back pressure control valve within said housing, a rotary handle externally of said housing and connected to said valve for controlling the back pressure on said back pressure control valve, a return line connected to said back pressure control valve for returning said material to said tank, a pressure gauge externally of said housing, the stem of said pressure gauge projecting through said housing and communicating with said manifold, a temperature gauge disposed adjacent to said pressure gauge, the stem of said temperature gauge projecting through said housing and communicating with said manifold for detecting the temperature of said material, a pipe leading from said manifold through said housing, a cutoff valve connected to said pipe externally of said housing, a flexible hose connected by one end to said cutoff valve, a hand operated valve at the other end of said hose, a decorator nozzle connected to said hand operated valve, and a heater within said housing below said manifold, said back pressure control valve being disposed between said manifold and said return line.

10. The dispensing machine defined in claim 9 wherein said reservoir tank is externally of and adjacent to said housing, said reservoir tank having an open top defined by a rim wherein said return line extends externally of said housing upwardly and over said rim and including a pipe extending from the intake side of said pump through said housing for communicating with the removable connection of said tank to said pump.

* * * * *